UNITED STATES PATENT OFFICE.

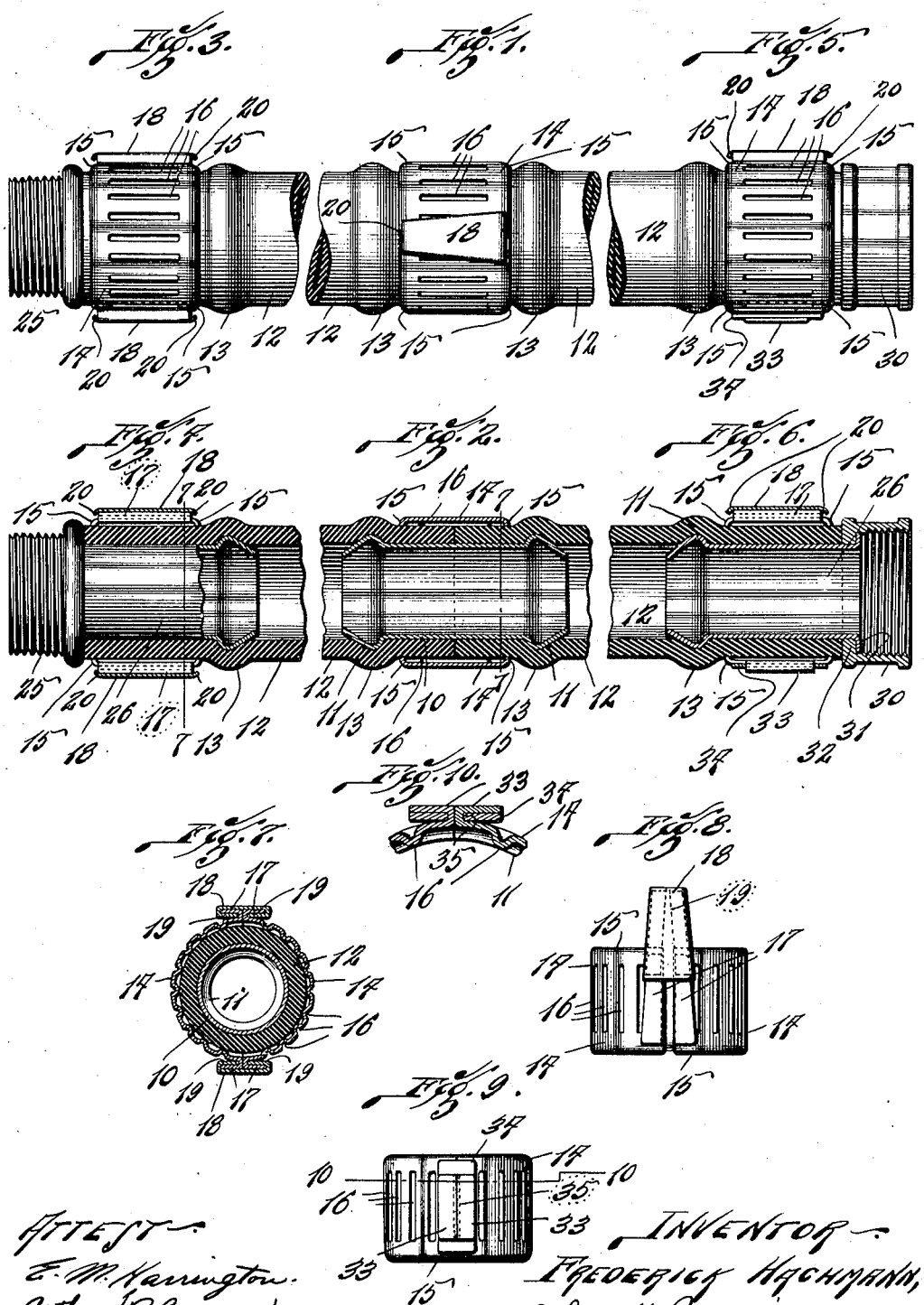

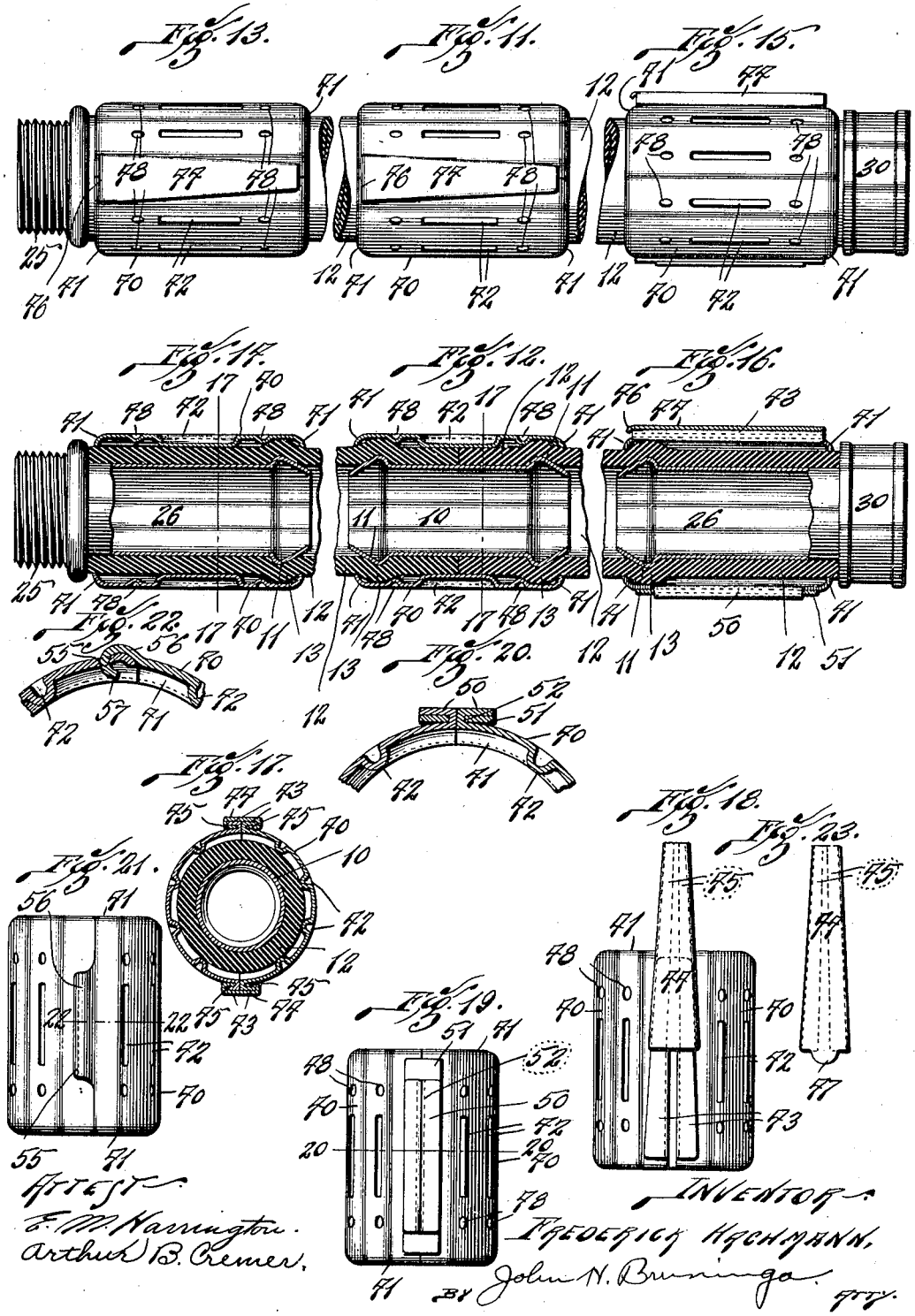

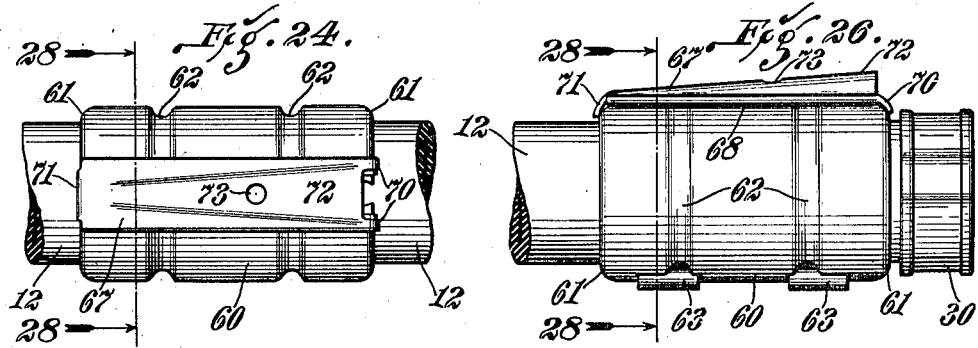
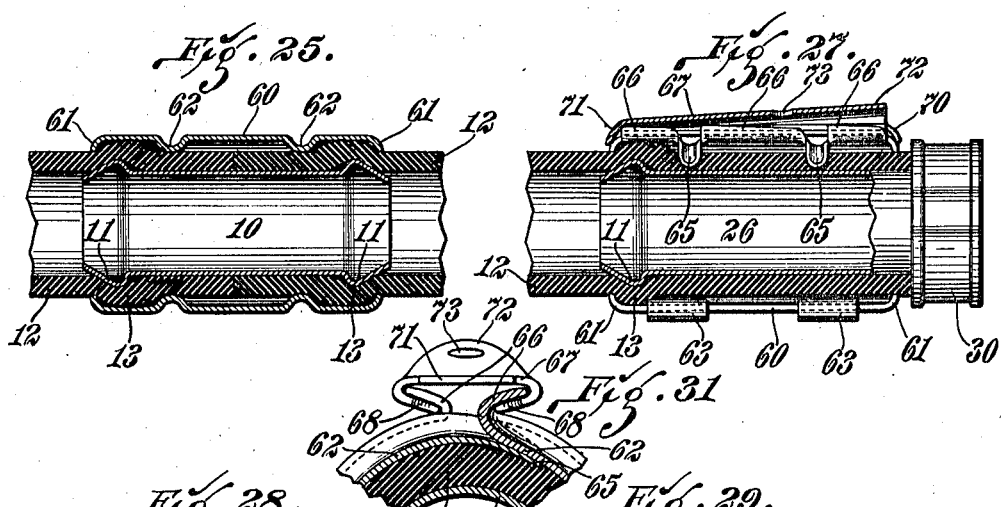
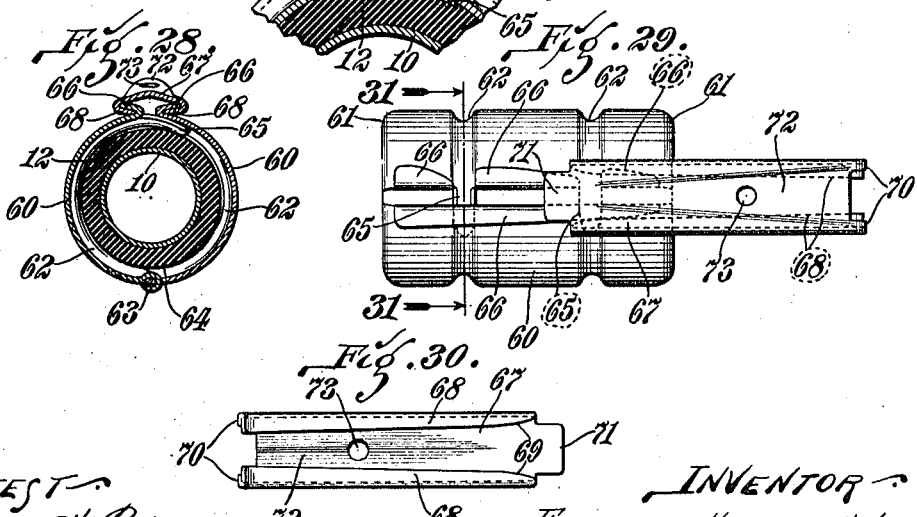

FREDERICK HACHMANN, OF ST. LOUIS, MISSOURI, ASSIGNOR OF ONE-HALF TO FRED C. SCHOENTHALER, OF ST. LOUIS, MISSOURI.

HOSE-COUPLING.

1,241,626.     Specification of Letters Patent.     Patented Oct. 2, 1917.

Application filed October 26, 1914. Serial No. 868,658.

*To all whom it may concern:*

Be it known that I, FREDERICK HACHMANN, a citizen of the United States, and residing at St. Louis, in the State of Missouri, have invented a certain new and useful Improvement in Hose-Couplings, of which the following is a specification.

This invention relates to hose couplings, and more particularly, to hose menders for rubber or other flexible hose.

One of the objects of this invention is to provide a hose coupling which can be used to connect two sections of hose, to connect a hose to the source of supply, and to form an end connection with a nozzle.

Another object is to provide a hose coupling which is simple in construction and operation, effective in its action, which consists of a few parts, and is cheap to manufacture.

Further objects will appear from the detail description taken in connection with the accompanying drawings, in which:

Figure 1 is an elevation of a coupling connecting two hose sections;

Fig. 2 is a section of Fig. 1;

Fig. 3 is an elevation illustrating an end connection;

Fig. 4 is a section of Fig. 3;

Fig. 5 is an elevation of another end connection;

Fig. 6 is a section of Fig. 5;

Fig. 7 is a section on the line 7—7, Figs. 2 or 4;

Fig. 8 is a detail of the sleeve shown in Figs. 1 to 4 inclusive;

Fig. 9 is a detail of the sleeve shown in Figs. 5 and 6;

Fig. 10 is a detail section on the line 10—10, Fig. 9;

Fig. 11 is an elevation of a coupling connecting two hose sections, and showing another embodiment of this invention;

Fig. 12 is a section of Fig. 11;

Fig. 13 is an elevation illustrating an end connection of another embodiment of this invention;

Fig. 14 is a section of Fig. 13;

Fig. 15 is an elevation of another end connection, showing another embodiment of this invention;

Fig. 16 is a section of Fig. 15;

Fig. 17 is a section on the line 17—17, Figs. 12 or 14;

Fig. 18 is a detail of the sleeve shown in Figs. 11 to 14 inclusive;

Fig. 19 is a detail of the sleeve shown in Figs. 15 and 16;

Fig. 20 is a detail section on the line 20—20, Fig. 19;

Fig. 21 is a detail of a sleeve showing still another embodiment of this invention;

Fig. 22 is a detail section on the line 22, Fig. 21;

Fig. 23 is a detail of a wedge, showing another embodiment of this invention;

Fig. 24 is an elevation of a coupling connecting two hose sections, and showing another embodiment of this invention;

Fig. 25 is a section of Fig. 24;

Fig. 26 is an elevation illustrating an end connection of another embodiment of this invention;

Fig. 27 is a section of Fig. 26;

Fig. 28 is a section on the line 28—28, Figs. 24 and 26;

Fig. 29 is a detail of the sleeve shown in Figs. 24 and 26;

Fig. 30 is a detail of the wedge; and,

Fig. 31 is an enlarged detail section on the line 31—31, Fig. 30, showing the hose and nipple.

Referring to the accompanying drawings, and more particularly, to Figs. 1, 2, 7 and 8, 10 designates a nipple having annular enlargements or shoulders 11 at its ends, the ends of the nipple being tapered to permit their ready insertion into the ends of the hose sections 12. The shoulders 11 form annular enlargements 13 on the hose sections. The means for clamping the hose sections on the nipple comprises a split sleeve having provisions for contracting the same to clamp it upon the hose. This sleeve consists of a pair of sections or halves 14, preferably formed of sheet metal, and having inwardly projecting end flanges 15, and ribs 16 struck therefrom to project inwardly and extending axially of the sleeve sections. Each sleeve section is provided with a longitudinal lip or flange 17, formed by bending the edge of the metal outwardly and circumferentially. Each lip is slightly shorter than the sleeve itself, and has an inclined outer edge. A wedge or clamping member 18, also preferably formed of sheet metal, has flanges 19 bent inwardly to embrace the lips 17, the flanges being slightly shorter than the wedge, and the wedge being slightly longer than the lips 17, so as to project beyond the same when in position. The wedge acts as a clamping member to contract the sleeve sections and clamp them on the hose.

To use the device to couple two hose sections, the hose sections to be joined are first applied over the ends of the nipple, thereby causing the shoulders 11 to expand the hose and form the annular enlargements 13. One of the clamping members 18 is now slipped partly into position on a pair of the lips 17 for holding the two sections of the split sleeve, as shown in Fig. 8, and the sleeve is thus placed around the hose, the connection between the lips and the clamping wedge being sufficiently flexible to permit such application. The other wedge is now passed over the lips on the opposite side and slid along the lips longitudinally of the sleeve, thereby causing a partial contraction of this sleeve. The first named wedge is now pushed completely home on the lips in the same manner, thereby causing the sleeve to be fully contracted so as to firmly clamp the hose sections to the nipple.

The sleeve and nipple are so proportioned as to cause the end flanges on the sleeve to be positioned at the bases of the annular enlargements 13, as clearly shown in Fig. 2. Moreover, the contracting of the sleeve causes the end flanges to sink into the rubber hose, so as to obtain a firm grip on the hose and clamp the hose firmly between the nipple shoulder and the flange. The longitudinal ribs 16, which also sink into the hose, prevent rotation of the hose sections with respect to each other and with respect to the nipple and sleeve, so that the hose sections cannot be worked apart by rotative movement. After the wedges or clamping members are in place, they may be locked in position by hammering over one or both ends, as shown at 20.

In Figs. 3 and 4, the invention is shown applied to an end coupling. The end coupling member 25, which is threaded to receive an internally threaded member, such as a nozzle, has a nipple 26, which is adapted to be inserted into the hose section 12. This nipple has an annular shoulder, and is otherwise of the construction shown in Fig. 2.

The hose is clamped to the nipple by a clamping sleeve of the same construction as shown in Figs. 1, 2, 7 and 8, and like parts are designated by like reference characters. The clamping action is substantially the same in both cases, and further description is, therefore, unnecessary.

In Figs. 5 and 6 is shown a coupling for making a connection to an externally threaded member, such as, a faucet. The coupling member 30 is, in this case, provided with a nipple 26 of the same construction as shown in Fig. 4. In order to make the connection between this sheet metal nipple and the coupling member 30, which is usually constructed of cast metal, the nipple is passed through the coupling member and flanged over, as shown at 31, so as to lie against the flange 32 of the coupling member 30, thereby forming a firm connection. The connection between the nipple 26 and the coupling member 25 is not shown, but it will be understood that it is similar to that shown in Figs. 5 and 6. The hose can be clamped on the nipple of Figs. 5 and 6 by the same clamping sleeve as shown in Figs. 1 to 4 inclusive and 7 and 8, and the action will, in this case, be, of course, the same. The specific construction of the clamping sleeve is, however, shown in detail in Figs. 9 and 10. In this construction, the sleeve sections 14 have one set of the edges thereof bent over, as shown at 33, so as to form lips. These lips are, however, considerably shorter than the lips 17, and the edges thereof are straight, and not inclined. A plate 34 has an oblong opening 35 therein, so as to form a link. This link is slipped over the lips 33 before they are bent down, and the lips are then bent over the link by a die to permanently but flexibly connect the sleeve sections. These sleeve sections are contracted by means of a wedge 18, similar in construction and operation to that shown in Figs. 1 to 4 inclusive and 7 and 8. The clamping sleeve is otherwise of the same construction as shown in Figs. 7 and 8.

In order to apply this clamping sleeve, the sections are spread apart, on their hinge connection, so as to encircle the hose, the connection being sufficiently flexible to permit this. The wedge 18 is then slipped on the lips 17, so as to contract the sleeve, to clamp the hose against the inside face of the shoulder 11. It will be understood that the clamping sleeve shown in Figs. 5 and 6 can be used for the other end connection, or as a mender for connecting two sections of hose, in the same manner as shown in Figs. 1 to 4 inclusive.

In the construction shown in Figs. 1 to 10 inclusive the clamping sleeve is so designed as to clamp the hose against the inside faces of the shoulders 11. In the construction shown in Figs. 11 to 30 inclusive, now to be described, the sleeve is so constructed as to grip the hose on both sides of the annular enlargements, and so as to clamp the hose against both faces of the annular shoulders on the nipple. In the construction shown in Figs. 11 to 30 inclusive, the devices are again illustrated as applied for joining two hose sections, and for making the end connections. The nipples and end connections are practically the same as in the construction shown in Figs. 1 to 10 inclusive, and like parts have, therefore, been designated by the same reference characters as used in Figs. 1 to 10 inclusive; a detail description of the similar parts will, therefore, be omitted.

Referring, first, to Figs. 11, 12, 17 and 18, 40 designates a pair of sleeve sections which are adapted to form together a split clamping sleeve. This sleeve also is preferably constructed of sheet metal, and has inwardly projecting flanges 41, and ribs 42 struck therefrom to project inwardly, and extending axially of the sleeve sections. The sleeve is further provided with inwardly projecting lugs 48 struck from the metal, and extending circumferentially around the sleeve, between the ribs 42 and the flange 41. The lips 43 have the inclined outer edges coöperating with the wedge or clamping member 44, which has flanges 45 taking under the lips 43.

The device is applied to the hose in the same manner as the device shown in Figs. 1 and 2. After the wedge 44 is in position, it is locked in the same manner as that heretofore described by bending or hammering over the forward edge 46. The wedge may be provided, at its forward end, with a short lug 47, as shown in Fig. 23, which lug can be readily bent down to securely lock the wedge in clamping position. It will be noted that, when the clamping sleeve is clamped on the hose, as shown in Fig. 12, the flange 41 will engage the hose on one side of the annular enlargement 13, while the inwardly projecting lugs 48 will engage the hose on the other side of the annular enlargement. This flange and these lugs will, therefore, coöperate with the annular shoulder to securely clamp the hose against the opposite faces of the shoulder. Furthermore, the ribs 42, as well as the lugs 48, will sink into the hose and press it tightly against the nipple, so as to not only form a tight joint, but also prevent rotation of the hose sections with respect to each other.

In Figs. 13 and 14, the device is shown applied to the end connection, the clamping sleeve being of the same construction as shown in Figs. 11 and 12. It will be understood that this clamping sleeve may also be applied to the hose to form the end connections of Figs. 15 and 16.

In Figs. 15, 16, 19 and 20, is shown a form of clamping sleeve incorporating the hinge connection shown in Figs. 9 and 10. In this construction, the lips 50 coöperate with the link 51, apertured as shown at 52 to receive the lips, so as to form a permanent but flexible connection between the sleeve sections. The sleeve sections are clamped on the hose by means of a wedge 44, the method of application and operation being similar as described for the construction shown in Figs. 9 and 10.

Figs. 21 and 22 show another form of hinge connection between the sections. In this construction, one section is provided with a slot 55 and an outstruck rib 56 in front of the slot. The other section is provided with a tongue 57 which is bent to take over the rib 56, passes through the slot, and is bent under, as shown in Fig. 22, to form a flexible connection between the sections. The provision of the rib 56 furnishes a recess to receive the end of the tongue 57 when the sleeve is opened to encircle the hose, and the bent-under lip 57 forms a rib sinking into the rubber hose, in the same manner as the ribs 42. The sleeve is clamped on the hose by means of a wedge 44, and the method of application is the same as described in the embodiment shown in Figs. 19 and 20. The parts are so constructed that, when the sleeve is clamped on the hose, the sections 40 will form, in effect, a continuous sleeve. It will be understood that this hinge connection may be applied to the constructions shown in Figs. 1 to 10 inclusive.

It will be noted that in all of the constructions as heretofore described, the coupling comprises a nipple having an annular shoulder or shoulders adapted to be inserted into and expand the hose, a split sheet metal sleeve, adapted to encircle the hose, and having an inwardly projecting flange or flanges adapted to coöperate with the nipple and the shoulder thereon, to clamp the hose transversely and against longitudinal movement, and a sheet metal taper key engaging lips 17 at the edges of the sleeve, so as to contact the sleeve on the hose and against the nipple. Upon referring more particularly to Figs. 8 and 18, however, it will be noted that the lips 17 and 43, respectively, do not run from end to end of the sleeve edges, but terminate short distances from the ends of the sleeves, and inside of the flanges 15 and 41, respectively. The result is, therefore, that there is a yielding connection between the flanges on one hand, and the taper key on the other hand, so that when the taper key is driven in place, the metal will yield, due to the inherent elasticity of the sheet metal material, so as to cause the sleeve to yieldingly clamp the hose on the nipple. This is important in that the sleeve can adapt itself to inequalities in the hose, and to two endwise joint hose sections, which are not of exactly the same diameter.

Referring now to Figs. 24 to 31 inclusive, the hingedly connected sheet metal sleeve sections 60 are provided with inwardly projecting end flanges 61, and inwardy projecting ribs 62 extending circumferentially around the sections. Lips 63 on one section engage slots 64 on the other section to form the hinge connection. The ribs 62 on one section have extensions or tongues 65, adapted to pass underneath the other section. These rib extensions or tongues taper to points as shown in Figs. 27, 28, 29 and 31, and are of channel form to engage and wedge under the ribs on the coöperating section. The lips or flanges 66 are bent outwardly from the sections, and their edges may be inclined, as shown in Fig. 29. A wedge or key 67 of sheet metal has its edges bent inwardly to form flanges 68 adapted to take under the flanges 66, and the edges of these flanges are inclined to engage the junctions of the flanges 66 with the sections. The forward ends of the flanges 68 are preferably rounded, as shown at 69, and the ends of the lips 66 are also rounded, as shown in Fig. 29, to facilitate the engagement of the key with the flanges on the sections. The rear end of the key has lugs 70 bent downwardly to engage one end flange 61, and limit the movement of the key, and the forward end of the key has a lug 71 adapted to be bent over the other end flange and lock the key in operative position. The key is struck up as shown at 72 to form a rib increasing in depth from the forward to the rear end of the key. The purpose of this rib is to impart elasticity to the key, causing the key to give, as it is passed over the flanges, and thereby result in a uniform tension and clamping action of the sections on the hose. The key is provided with a hole 73 adapted to be engaged by a tool to withdraw the key. All parts are made of sheet metal and formed by stamping. The device is applied to the hose in the same manner as in the other constructions. The parts are so constructed that the end flange 61 will lie on one side of the enlargement 13, while the rib will lie on the other side. The contracting of the sleeve sections will cause both flange and rib to sink into the rubber, clamp the hose against the nipple on both sides of the enlargement, and make a tight joint. The tongues 65 on one section wedging underneath the other section, will not only make the joint tight, but will cause a clamping action through 360°. The elasticity of the key causes the flanges and ribs to clamp the hose uniformly on both ends.

It will thus be seen that the invention accomplishes its objects. A device is produced which is not only simple in construction and operation, but also has a universal application. Since the sleeve is made of two flexibly connected sections, a uniform clamping action is obtained, and the sleeve can be readily passed over the hose, since the connection between the flanges or lips 17, 33, 43, and 50, and the wedges 18 and 44, and plates 34 and 51, and the hinge connections 55, 56 and 63, 64 is flexible enough for that purpose. The parts can be readily formed of sheet metal by simple die operations. When the device is in position on the hose, it will not only form a tight joint, but will also be devoid of projecting parts. The device can be applied to form a mender connecting two hose sections, or for forming the end connections. For all of these connections, a single clamping sleeve can be used.

It is obvious that various changes may be made in details of construction without departing from the spirit of this invention, and it is, therefore, to be understood that this invention is not to be limited to the specific construction shown and described.

Having thus described the invention, what is claimed is:

1. A hose coupling comprising a split sheet metal sleeve having its edges bent over to form longitudinally extending lips, inwardly projecting hose engaging flanges on said sleeve, and a sliding sheet metal member having bent over flanges adapted to take over said lips, constructed to yieldingly contract said sleeve.

2. A hose coupling comprising a split sleeve adapted to encircle a hose, inwardly projecting hose engaging flanges on said sleeve, and a yielding member adapted to engage the opposed free edges of said sleeve to contract the same, said yielding member adapting the sleeve to hose of different sizes or thicknesses.

3. A hose coupling comprising a split sleeve adapted to encircle a hose, inwardly projecting hose engaging flanges on said sleeve, and a member adapted to engage the opposed free edges of said sleeve to contract the same, said member being yieldable transversely, adapting the sleeve to hose of different sizes or thicknesses.

4. A hose coupling comprising a split sleeve adapted to encircle a hose, an inwardly projecting hose engaging flange on said sleeve, and a yielding sliding taper key adapted to engage the opposed free edges of said sleeve to contract the same, said yielding key adapting the sleeve to hose of different sizes or thicknesses.

5. A hose coupling comprising a split sleeve adapted to encircle a hose, an inwardly projecting end flange on said sleeve, and a sliding taper key adapted to engage the free ends of said sleeve to contract the same, said key having a struck up rib extending therealong to render it yielding.

6. A hose coupling comprising a split sleeve adapted to encircle a hose, inwardly projecting end flanges on said sleeve, and a sliding taper key adapted to engage the free ends of said sleeve to contract the same, said key having a struck up rib extending therealong and increasing in depth from end to end to render it yielding.

7. A hose coupling comprising a split sheet metal sleeve having inwardly extending hose engaging portions struck therefrom and having its opposed edges bent to form projecting lips, and a sliding sheet metal member having bent over flanges adapted to take over said lips and constructed to yieldingly contract said sleeve.

8. A hose coupling comprising a split sheet metal sleeve having inwardly projecting hose engaging ribs struck therefrom and having its opposed edges bent to form projecting lips, and a sliding sheet metal member having bent over flanges adapted to take over said lips and constructed to yieldingly contract said sleeve.

9. A hose coupling comprising a nipple having an annular shoulder adapted to be inserted into and expand the hose, a split sheet metal sleeve adapted to encircle the hose and having an inwardly projecting flange adapted to coöperate with said nipple and the shoulder thereon to clamp the hose transversely and against longitudinal movement, and a sheet metal taper key adapted to contract said sleeve, said parts being constructed and arranged to yieldingly clamp the hose.

10. A hose mender comprising a nipple having enlarged annular shoulders adjacent its ends adapted to expand the hose sections at points remote from their meeting ends, a split sheet metal sleeve adapted to encircle the hose and having inwardly projecting flanges adapted to coöperate with said nipple and the shoulders thereon to clamp the hose transversely and against longitudinal movement, and a sheet metal taper key adapted to contract said sleeve, said parts being constructed and arranged to yieldingly clamp the hose.

11. A hose coupling comprising a nipple having an annular shoulder adapted to be inserted into and expand the hose and form an annular enlargement thereon, a split sheet metal sleeve adapted to encircle the hose and having an inwardly projecting flange adapted to engage the hose adjacent the annular enlargement and coöperate with said nipple and the shoulder thereon to clamp the hose transversely and against longitudinal movement, and means for contracting said sleeve, constructed and arranged to yieldingly clamp the hose on said nipple.

12. A hose mender comprising a nipple having enlarged annular shoulders adjacent its ends adapted to expand the hose sections at points remote from their meeting ends and form annular enlargements thereon, a split sheet metal sleeve adapted to encircle the hose and having inwardly projecting flanges adapted to engage the hose adjacent the annular enlargements and coöperate with said nipple and the shoulders thereon to clamp the hose transversely and against longitudinal movement, and means for contracting said sleeve, constructed and arranged to yieldingly clamp the hose on said nipple.

In testimony whereof I affix my signature in the presence of these two witnesses.

FREDERICK HACHMANN.

Witnesses:
ARTHUR B. CREMER,
MATTHEW L. MASTEN.